United States Patent

Hurlbert

[15] 3,657,918

[45] Apr. 25, 1972

[54] PERFORMANCE MONITOR FOR A VERTICAL GYRO

[72] Inventor: Charles E. Hurlbert, River Edge, N.J.

[73] Assignee: The Bendix Corporation

[22] Filed: June 19, 1969

[21] Appl. No.: 834,722

[52] U.S. Cl..............................73/1 D, 73/178 R, 74/5.47, 74/5.6

[51] Int. Cl.......................................................G01c 21/10

[58] Field of Search ....................73/1 D, 1 E, 178; 74/5.41, 74/5.46, 5.47, 5.8; 33/204.2

[56] References Cited

UNITED STATES PATENTS

| 2,968,957 | 1/1961 | Condie et al. | 74/5.47 |
| 3,226,986 | 1/1966 | Rafferty | 74/5.41 |
| 3,276,269 | 10/1966 | Whitehead | 74/5.41 |
| 3,466,935 | 9/1969 | Lanni | 74/5.8 |

*Primary Examiner*—S. Clement Swisher
*Attorney*—Anthony F. Cuoco and Plante, Hartz, Smith & Thompson

[57] ABSTRACT

Apparatus for monitoring a vertical gyro includes means for monitoring gyro vertically in the roll axis as a function of true air speed and rate of turn and monitoring vertically in the pitch axis as a function of air speed rate of change.

9 Claims, 3 Drawing Figures

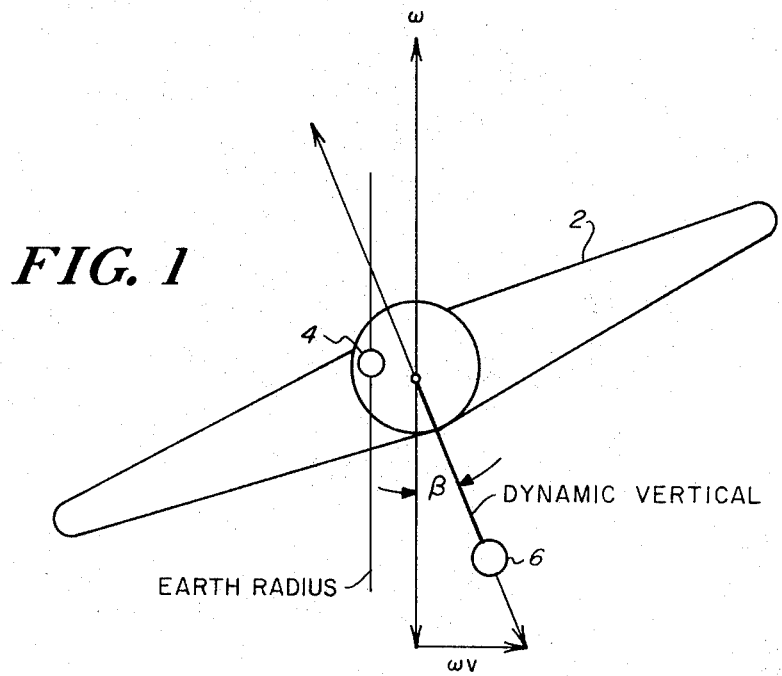
*FIG. 1*
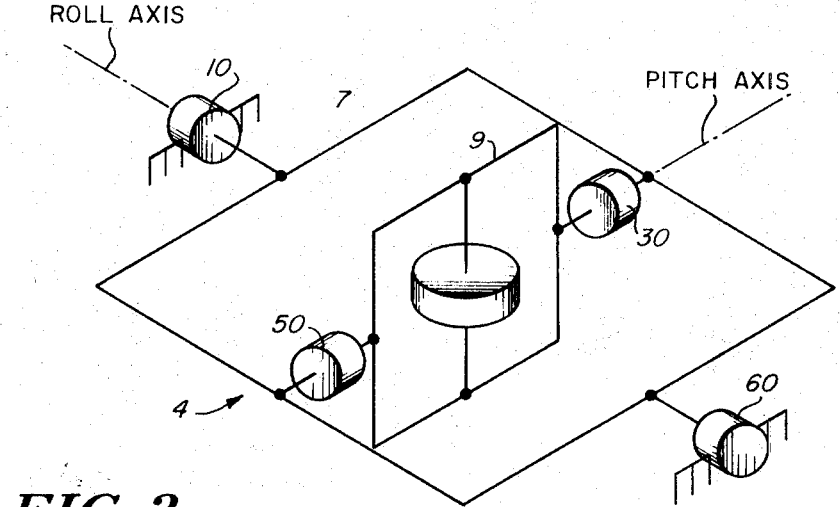
*FIG. 3*
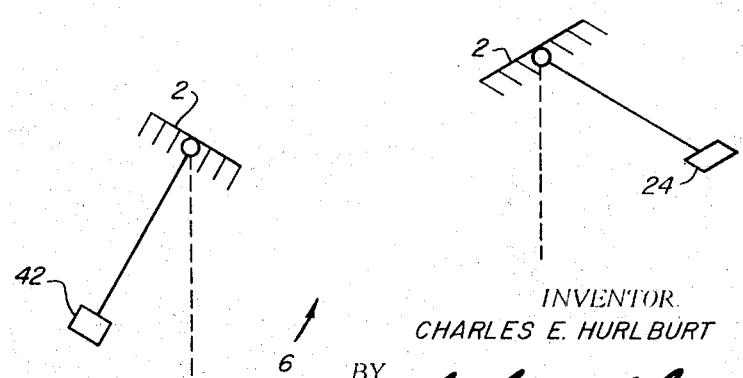
INVENTOR
CHARLES E. HURLBURT
BY
ATTORNEY

3,657,918

PERFORMANCE MONITOR FOR A VERTICAL GYRO

BACKGROUND OF THE INVENTION

1. Field of the Invention

This invention relates to apparatus for monitoring vertical gyros and, more particularly, to apparatus of the type described for monitoring vertical gyros independent of associated circuit parameters.

2. Description of the Prior Art

Prior to the present invention, vertical gyro performance has been monitored by monitoring circuit parameters such as voltages, current, motor speed, etc., with the thought being that the cumulative result of component performance provides a correct end result. Monitoring of these parameters, however, does now detect gimbal bearing friction, structural failure or a host of other conditions resulting in incorrect vertical information being supplied by the gyro to an aircraft human or auto pilot.

SUMMARY OF THE INVENTION

This invention contemplates means for monitoring the functional output of a vertical gyro in roll and pitch axes. In the roll axis, the product of true airspeed and rate of turn is compared to the difference between gyro and airframe mounted pendulum positions to measure gyro verticality and in the pitch axis the measurement is accomplished by comparing the difference between gyro and pendulum positions to rate of change of airspeed.

One object of this inventions is to provide means for monitoring gyro verticality independent of gyro circuit parameters.

Another object of this invention is to monitor gyro verticality in the roll axis as a function of true air speed and rate of turn, and to monitor verticality in the pitch axis as a function of air speed rate of change.

Another object of this invention is to monitor gyro verticality by comparing gyro position to the position of an airframe mounted pendulum.

The foregoing and other objects and advantages of the invention will appear more fully hereinafter from a consideration of the detailed description which follows, taken together with the accompanying drawings, wherein several embodiments of the invention are illustrated by way of example. It is to be expressly understood, however, that the drawings are for illustration purposes only and are not to be construed as defining the limits of the invention.

DESCRIPTION OF THE DRAWINGS

FIG. 1 is a diagrammatic representation showing the trigonometric relationships employed in the device of the invention.

FIG. 3 is a diagrammatic representation showing gyro and pendulum component mounting.

DESCRIPTION OF THE INVENTION

Figure 2:
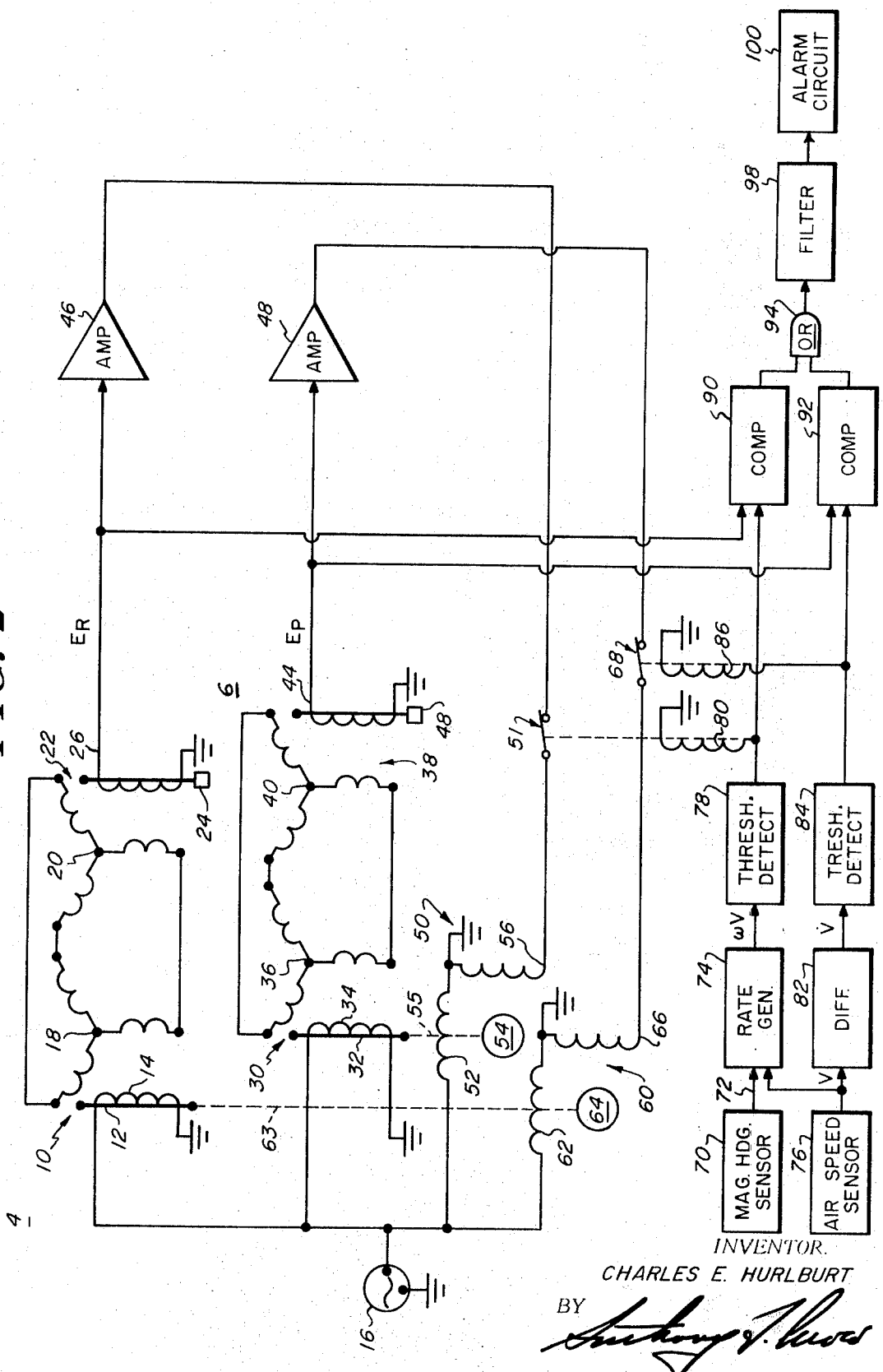
FIG. 2 is a combination electrical schematic and block diagram showing the device of the invention.

With reference to FIG. 1, there is shown an aircraft 2 engaged in a turn maneuver and having a vertical gyro 4 mounted thereon and a pendulous mass 6 mounted to the airframe of the craft.

In the roll axis, pendulum 6 is positioned along dynamic vertical and gyro 4, if correct, is positioned along an earth radius. In straight and level flight dynamic vertical and earth radius essentially coincide, and when aircraft 2 is performing a turn maneuver these axes differ by an angle $\beta$ determined by earth's gravity ($g$) and centripetal acceleration of the turn. Centripetal acceleration is the product $\omega V$ of linear velocity $V$ with respect to air (airspeed) and rate of turn $\omega$.

Thus, the difference between pendulum and gyro positions (angle $\beta$) is as follows:

$$\operatorname{Tan} \beta = \omega V/g ; \qquad (1)$$

FIG. 3 shows a gyro 4 having an outer gimbal 7 arranged to rotate about the roll axis and an inner gimbal 9 arranged to rotate about the pitch axis as is well known in the art.

FIG. 2 shows gyro 4 having a roll axis synchro 10 mounted to the gyro frame as shown in FIG. 3, and which roll axis synchro has a rotor element 12 carrying a rotor winding 14 energized by a suitable source of alternating current 16. Rotor winding 14 is inductively coupled to a stator winding 18.

Stator winding 18 of synchro 10 is connected to a stator winding 20 of a synchro 22 carried by a pendulum 6, and which pendulum 6 includes a pendulum mass 24 carrying a winding 26 inductively coupled to stator winding 20 and connected to an amplifier 46.

Pendulum 6 is mounted to the frame of aircraft 2 so that pendulus mass 24 is displaced with motion of the craft about the roll axis as shown in FIG. 3 for providing at winding 26 a roll erection signal $E_r$.

Gyro 4 has a pitch axis synchro 30 mounted to inner gimbal 9 in FIG. 3, and which pitch axis synchro has a rotor element 32 carrying a rotor winding 34 energized by alternating current source 16 as shown in FIG. 2. Rotor winding 34 is inductively coupled to a stator winding 36.

Stator winding 36 is connected to a stator winding 40 of a synchro 38 carried by pendulum 6, and which pendulum 6 includes a pendulum mass 42 carrying a winding 44 inductively coupled to winding 40 and connected to an amplifier 48. Pendulum 6 is mounted to the frame of aircraft 2 as shown in FIG. 3 so that pendulus mass 42 is displaced with motion of the craft about the pitch axis for providing at winding 44 a pitch erection signal $E_p$.

An roll axis torquer 60 mounted to outer gimbal 7 as shown in FIG. 3 has a winding 62 connected to alternating current source 16 and a winding 66 connected to winding 62 and connected through a normally closed erection witch 68 to amplifier 48. Torquer 60 has a rotor element 64 connected by suitable mechanical means 63 to rotor element 12 of roll axis synchro 10.

A pitch axis torquer 50 has a winding 52 connected to alternating current source 16 and a winding 56 connected to winding 52 and connected through a normally closed erection switch 51 to amplifier 46. Torquer 50 has a rotor element 54 connected by suitable mechanical means 55 to rotor element 32 of synchro 30.

A magnetic heading sensor 70 has an output shaft 72 coupled to a rate generator 74, and which rate generator 74 is excited by the output from an air speed sensor 76 to provide an output $\omega V$. Rate generator 74 is connected to a threshold detector 78 so as to apply output $\omega V$ thereto, and when this output exceeds a predetermined threshold, threshold detector 78 provides an output for energizing a relay 80 to open switch 51 thereby opening the roll erection loop.

Air speed sensor 76 is connected to a differentiator 82 which differentiates output $V$ therefrom to provide an airspeed rate output $\dot V$. Output $\dot V$ is applied to a threshold detector 84, and when this output exceeds a predetermined threshold, threshold detector 84 provides an output for energizing a relay 86 to open switch 68 thereby opening the pitch erection loop.

Roll erection signal $E_r$ is applied to a comparator 90 and compared thereby with the output from threshold detector 78. Pitch erection signal $E_p$ is applied to a comparator 92 and compared thereby with the output from threshold detector 84. Comparators 90 and 92 are connected to an OR gate 94, and when the outputs from one or the other of the comparators 90 and 92 exceeds a predetermined level, OR gate 94 provides an output which may be applied through a suitable filter 98 to an alarm circuit 100 for indicating verticality error.

OPERATION

From the aforegoing description of the invention it will now be seen that there is provided apparatus for monitoring gyro verticality under static and dynamic conditions. The invention is preferable to conventional monitoring means in that individual circuit parameters are not relied upon for functional testing of the gyro. As has been the occasion, failure due to gyro "hang-up" or bearing "freezing" goes undetected when conventional monitoring means are used. The device of the invention uses airspeed data ($V$) and rate of turn data ($\omega$) to compute a vertical indication, and which indication is constantly compared to the output of the gyro to monitor gyro verticality. In this connection it is to be noted that threshold limits employed in the invention may be selected broad enough to allow for errors in the computational scheme, yet narrow enough to detect any symptomatic failure of the gyro.

During turn maneuvers, pendulum 6 seeks dynamic vertical, i.e., the vector sum of gravity ($g$) and centripetal acceleration ($\omega V$). In space, the pendulum is off vertical by an angle $\beta$ as shown in FIG. 2. If angle $\beta$ exceeds the threshold of threshold detector 78, and which threshold may be, for purposes of illustration, 3°, then switch 51 will open to open the roll axis vertical erection loop whereby gyro 4 remains erect except for a small drift component. Signal $E_r$ which, in effect, is the difference between the gyro and pendulum signals then corresponds to angle $\beta$.

At the same time, the $\omega V$ computation implemented by heading sensor 70, rate generator 74 and airspeed sensor 76 also provides a signal indicating angle $\beta$, and hence, by comparing the two signals as implemented by comparator 90, continuous monitoring of the system in the roll axis is provided.

A similar arrangement is provided for monitoring pitch axis verticality wherein the acceleration signal ($\dot{V}$) provided by differentiating air speed signal ($V$) is compared to pitch erection signal $E_p$.

It is to be noted that the objective of erection cut-off as implemented by opening switches 51 and 68 is to prevent gyro 4 from seeking dynamic vertical. The optimum value at which erection cut-off is achieved is obtained as a compromise between free gyro drift (with erection cut-off) during a fairly sharp turn and erection to dynamic vertical for a sustained shallow turn. If the sharp turn provides a dynamic vertical in excess of 3°, the erection loop is opened and gyro 4 drifts free.

The device of the invention provides a system whereby the attitude of aircraft 2 with respect to either gyro 4 or pendulum 6 may be monitored. Additionally, removal of pendulum 6 from the inner gimbal of gyro 4 to the frame of aircraft 2 reduces gyro weight and inertial load. Since fewer slip rings may thereby be used on the gyro assembly, reduced friction and reduced random gyro drift are achieved.

While several embodiments of the invention have been illustrated and described in detail, it is to be expressly understood that the invention is not limited thereto. Various changes may also be made in the design and arrangement of the parts without departing from the spirit and scope of the invention as the same will not be understood by those skilled in the art.

What is claimed is:

1. A vertical gyro system for aircraft comprising:
 a pendulum mounted to the craft so as to be responsive to displacement thereof about the pitch axis;
 means connected to the gyro and to the pendulum for providing a signal corresponding to the difference between gyro and pendulum positions when the craft is displaced about the pitch axis;
 means for providing an aircraft airspeed signal;
 means connected to the pitch axis difference signal means and the airspeed signal means and responsive to the signals therefrom for providing a pitch axis monitoring signal;
 means for providing an aircraft heading signal;
 a second pendulum mounted to the craft so as to be responsive to displacement thereof about the roll axis;
 means connected to the gyro and to the second pendulum for providing a signal corresponding to the difference between gyro and pendulum positions when the craft is displaced about the roll axis;
 means connected to the roll axis difference signal means, the heading signal means and the airspeed signal means and responsive to the signals therefrom for providing a roll axis monitoring signal;
 means connected to the roll axis signal means and responsive to the signal therefrom for monitoring gyro verticality; and
 means connected to the roll axis monitoring signal means and to the pitch axis monitoring signal means and responsive to the signals therefrom for monitoring gyro verticality.

2. A system as described by claim 11, wherein the means for providing a roll axis monitoring signal includes:
 a rate generator connected to the heading signal means and to the airspeed signal means and responsive to the signals therefrom for providing a signal corresponding to the centripetal force of the craft; and
 a comparator connected to the rate generator and to the roll axis difference signal means for comparing the signals therefrom and for providing the roll axis monitoring signal in accordance with the difference therebetween.

3. A system as described by claim 1, wherein the vertical gyro includes:
 a roll axis synchro having a rotor, a winding carried by the rotor and a stator winding inductively coupled to the rotor winding;
 a pitch axis synchro having a rotor, a winding carried by the rotor and a stator winding inductively coupled to the rotor winding;
 a roll axis torquer having a rotor coupled to the rotor of the roll axis synchro and a pair of inductively coupled windings; and
 a pitch axis torquer having a rotor coupled to the rotor of the roll axis synchro and a pair of inductively coupled windings.

4. A system as described by claim 3 wherein the pendulum includes:
 a roll axis pendulum having a stator winding connected to the stator winding of the roll axis synchro, a pendulus mass sensitive to displacement of the craft about the roll axis and a winding carried by the pendulus mass and inductively coupled to the stator winding; and
 a pitch axis pendulum having a stator winding connected to the stator winding of the pitch axis synchro, a pendulus mass sensitive to displacement of the craft about the pitch axis and a winding carried by the pendulus mass and inductively coupled to the stator winding.

5. A system as described by claim 4, including:
 a first normally closed switch for connecting one of the windings of the roll axis torquer to the winding carried by the pitch axis pendulum mass.
 a second normally closed switch for connecting one of the windings of the pitch axis torquer to the winding carried by the roll axis pendulum mass;
 means connected to the rate generator and responsive to the centripetal force signal therefrom above a predetermined level for opening the first switch; and
 means connected to the differentiator and responsive to the differentiated airspeed signal therefrom above a predetermined level for opening the second switch.

6. A system as described by claim 5, wherein:
 the means connected to the rate generator and responsive to the centripetal force signal therefrom above a predetermined level for opening the first switch includes a threshold detector for detecting when the centripetal force signal exceeds the predetermined level and thereupon providing a controlling output, and a relay connected to the threshold detector and connected to the first switch, and energized by the controlling output for closing said switch; and
 the means connected to the differentiator and responsive to the differentiated airspeed signal therefrom above a predetermined level includes another threshold detector for detecting when the differentiated airspeed signal exceeds the predetermined level and thereupon providing another controlling output, and another relay connected to the other threshold detector and connected to the second switch, and energized by the other controlling output for closing said switch.

7. A system as described by claim 5, including:

A source of alternating current connected to the roll axis synchro rotor winding, the pitch axis synchro rotor winding, the other of the pitch axis torquer windings and the other of the roll axis torquer windings for exciting said roll and pitch synchros and said roll and pitch torquers.

8. A system as described by claim 5, including:

an amplifier connected intermediate the first switch and the winding carried by the pitch axis pendulus mass; and another amplifier connected intermediate the second switch and the winding carried by the roll axis pendulus mass.

9. A system as described by claim 1, wherein the means connected to the roll axis monitoring signal means and to the pitch axis monitoring signal means and responsive to the signals therefrom for monitoring gyro verticality includes:

gating means connected to the roll axis monitoring signal means and to the pitch axis monitoring signal means and responsive to the signals therefrom for providing a controlling output when one of said signals exceeds a predetermined level;

filter means connected to the gating means for filtering the controlling output; and indicating means connected to the filter means and responsive to the filtered control signal for actuating the indicating means to signal verticality error.

* * * * *

UNITED STATES PATENT OFFICE
CERTIFICATE OF CORRECTION

Patent No. 3,657,918  Dated  April 25, 1972

Inventor(s)  Charles E. Hurlburt

It is certified that error appears in the above-identified patent and that said Letters Patent are hereby corrected as shown below:

On the cover sheet [72] the inventor's name should read -- Charles E. Hurlburt --.

Signed and sealed this 20th day of March 1973.

(SEAL)
Attest:

EDWARD M. FLETCHER, JR.  ROBERT GOTTSCHALK
Attesting Officer  Commissioner of Patents